(12) United States Patent
Remboski et al.

(10) Patent No.: US 10,800,254 B2
(45) Date of Patent: Oct. 13, 2020

(54) DRIVELINE ASSEMBLY FOR AN ELECTRIC VEHICLE

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 0 days.

(21) Appl. No.: 16/159,983

(22) Filed: Oct. 15, 2018

(65) Prior Publication Data

US 2019/0111778 A1    Apr. 18, 2019

Related U.S. Application Data

(60) Provisional application No. 62/572,597, filed on Oct. 16, 2017.

(51) Int. Cl.
*B60K 17/04*    (2006.01)
*B60K 17/24*    (2006.01)
(Continued)

(52) U.S. Cl.
CPC .............. *B60K 17/046* (2013.01); *B60K 1/00* (2013.01); *B60K 6/445* (2013.01); *B60K 6/54* (2013.01);
(Continued)

(58) Field of Classification Search
CPC .... B60K 17/04; B60K 17/043; B60K 17/046; B60K 17/165; B60K 17/24; B60K 6/445;
(Continued)

(56) References Cited

U.S. PATENT DOCUMENTS 3,184,985 A    5/1965 Dreitzler
3,420,327 A    1/1969 Nallinger et al.
(Continued)

FOREIGN PATENT DOCUMENTS

DE        19680744 B4    2/2011
DE    102010050709 A1    5/2012
(Continued)

OTHER PUBLICATIONS

International Search Report; PCT/US2018/055984; dated Jan. 23, 2019; 4 pages.

*Primary Examiner* — Charles A Fox
*Assistant Examiner* — Lori Wu
(74) *Attorney, Agent, or Firm* — Dickinson Wright PLLC

(57) ABSTRACT

A driveline assembly for an electric vehicle for driving a pair of wheels. The driveline assembly includes an electric motor having an output shaft. A differential is coupled with the output shaft and is configured to receive torque from the output shaft. A pair of primary shafts are each coupled with the differential and configured to receive torque from the differential. A pair of end reducers are each configured to receive torque from one of the primary shafts and provide a gear reduction and torque multiplying effect at a wheel output. A controller is connected to the electric motor and is configured to superimpose a torque fluctuation at the output shaft to counteract vibrations in the driveline assembly.

8 Claims, 1 Drawing Sheet

(51) Int. Cl.
*F16F 15/02* (2006.01)
*B60K 6/54* (2007.10)
*B60K 6/445* (2007.10)
*B60K 7/00* (2006.01)
*B60K 1/00* (2006.01)
*B60K 17/16* (2006.01)
*F16H 1/28* (2006.01)
*F16H 57/00* (2012.01)

(52) U.S. Cl.
CPC .......... *B60K 7/0007* (2013.01); *B60K 17/165* (2013.01); *B60K 17/24* (2013.01); *F16F 15/021* (2013.01); *B60G 2400/302* (2013.01); *B60K 2001/001* (2013.01); *F16H 2001/2881* (2013.01); *F16H 2057/0012* (2013.01)

(58) Field of Classification Search
CPC ...... B60K 6/54; B60K 7/0007; B60K 7/0046; B60K 7/0092; B60K 1/00; B60K 2001/001; F16H 2057/012; F16F 15/10
See application file for complete search history.

(56) References Cited

U.S. PATENT DOCUMENTS

| | | | |
|---|---|---|---|
| 5,024,636 A | | 6/1991 | Phebus et al. |
| 5,109,815 A | | 5/1992 | Maeda et al. |
| 5,419,406 A | * | 5/1995 | Kawamoto ............ B60K 1/02 180/65.6 |
| 6,024,182 A | * | 2/2000 | Hamada .................. B60K 1/00 180/6.28 |
| 6,117,040 A | | 9/2000 | Watterodt et al. |
| 6,652,405 B2 | | 11/2003 | Staheli et al. |
| 8,313,410 B2 | | 11/2012 | Varela |
| 2017/0302201 A1 | * | 10/2017 | Saito ...................... H02P 21/05 |

FOREIGN PATENT DOCUMENTS

| | | |
|---|---|---|
| EP | 1810862 A1 | 7/2007 |
| EP | 2548753 A1 | 1/2013 |
| EP | 2905510 A1 | 8/2015 |

* cited by examiner

DRIVELINE ASSEMBLY FOR AN ELECTRIC VEHICLE

CROSS-REFERENCE TO RELATED APPLICATIONS

This U.S. patent application claims the benefit of U.S. Provisional Patent Application Ser. No. 62/572,597 filed Oct. 16, 2017, entitled "Driveline Assembly for an Electric Vehicle," the entire disclosure of the application being considered part of the disclosure of this application and hereby incorporated by reference.

FIELD OF THE DISCLOSURE

A driveline assembly for an electric vehicle. More particularly, a driveline assembly for an electric vehicle including an end reducer adjacent to each wheel for providing a torque multiplying effect at the wheel.

BACKGROUND OF THE INVENTION

Electric vehicles are known to include a driveline assembly for driving one or more wheels. The driveline assembly typically includes a center section that has an electric motor that has an output shaft which is connected to a differential. The differential is coupled with a pair of primary axles for transmitting torque from the output shaft to the primary axles and a pair of the wheels. A gear reducer is typically positioned between the output shaft and the differential for providing a gear reduction prior to the transmittal of torque to the primary shafts. This lumped architecture leads to heavy torque loading on the primary axles and heavy structural loading on chassis components that support the center section. These factors combine to provide relatively high mass and package space requirements for the driveline assembly. Accordingly, there remains a need for improvements to such driveline assemblies.

SUMMARY OF THE INVENTION

A driveline assembly for an electric vehicle for driving a pair of wheels includes an electric motor having an output shaft. A differential is coupled with the output shaft and is configured to receive torque from the output shaft. A pair of primary shafts are each coupled with the differential and are configured to receive torque from the differential. A pair of end reducers are each configured to receive torque from one of the primary shafts and to provide a gear reduction and torque multiplying effect at a wheel output. A controller is connected to the electric motor and is configured to superimpose a torque fluctuation at the output shaft to counteract vibrations in the driveline assembly.

The combination of the electric motor packaged with the differential and end reducers adjacent to the wheels allows the various driveline components to be small and lightweight. Therefore, interior space of the vehicle is increased and vehicle mass is reduced. Due to the reduced mass of the driveline assembly, low resonance frequencies of the driveline assembly may be present. Imposing a torque fluctuation at the output shaft of the electric motor advantageously cancels vibrations in the driveline assembly, especially at low resonant frequencies.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
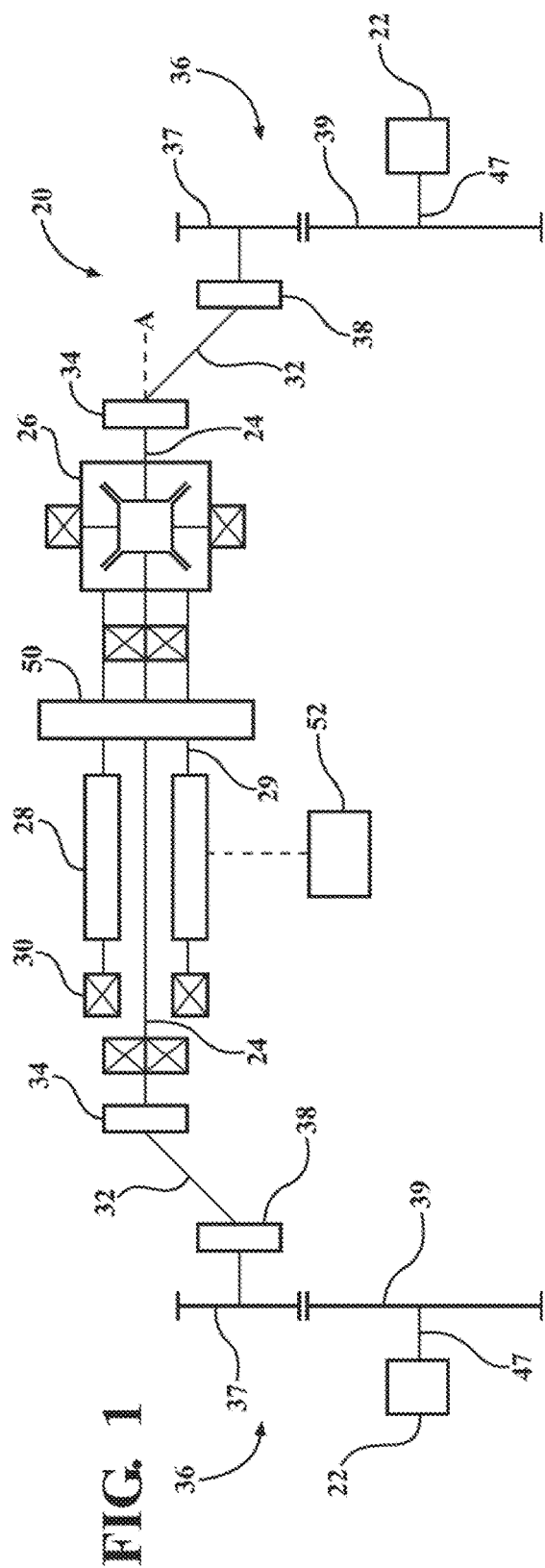
FIG. 1 is a schematic illustration of an example embodiment of a driveline assembly including a first example embodiment of an end reducer including a pair of parallel axis gears.

Referring to the Figures, wherein like numerals indicate corresponding parts throughout the several views, a driveline assembly 20 for a vehicle is generally shown. The driveline assembly 20 is configured to drive a pair of wheels 22. It should be appreciated that the subject driveline assembly 20 may be used on various types of vehicles including, but not limited to automobiles, recreational vehicles and all-terrain vehicles.

The driveline assembly 20 includes a pair of primary shafts 24 disposed generally about and along an axis A in alignment with one another. A differential 26 interconnects the primary shafts 24. The differential 26 is configured to transmit different amounts of torque to each of the primary shafts 24 and to allow the primary shafts 24 to rotate at different speeds than one another. An electric motor 28 is disposed about one of the primary shafts 24 and includes a rotatable output shaft 29 that is coupled with the differential 26 for transmitting torque to the differential 26 and thus the primary shafts 24. A plurality of motor bearings 30 are positioned for allowing the primary shaft 24 to rotate relative to the electric motor 28. It should be appreciated that the electric motor 28 could also be rotatably mounted along the primary shafts 24 by way of a supporting lubricant.

A pair of secondary shafts 32 are each coupled with one of the primary shafts 24. A pair of first continuous velocity joints 34 each pivotably connect one of the primary shafts 24 and one of the secondary shafts 32 and are configured to transmit torque from the primary shaft 24 to the secondary shaft 32 while being positioned at various angles relative to the primary shafts 24. A pair of end reducers 36, 136 are each coupled with one of the secondary shafts 32 for being coupled with one of the wheels 22 for providing various gear ratios to provide a torque multiplying effect at the wheel 22.

A pair of second continuous velocity joints 38 each pivotably connect one of the secondary shafts 32 and one of the end reducers 36, 136 and are configured to transmit torque from the secondary shafts 32 to the end reducers 36, 136 while allowing the end reducer 36, 136 to be positioned at various angle relative to the secondary shaft 32.

According to a first example embodiment of the end reducers 36 presented in FIG. 1, the pair of end reducers 36 each include a first gear 37 and a second gear 39 that are positioned in parallel relationship and meshed with one another. The first gear 37 is connected to an output from the second continuous velocity joint 38 for receiving torque therefrom. The second gear 39 is connected to a wheel output 47 for transmitting torque to the wheel output 47. The number of teeth on the second gear 39 is greater than the number of teeth on the first gear 37 to provide a torque multiplying effect to the wheel 22. It should be appreciated that the diameter and tooth size of the first and second gears 37, 39 may be varied in order to provide a desired gear reduction.

Figure 2:
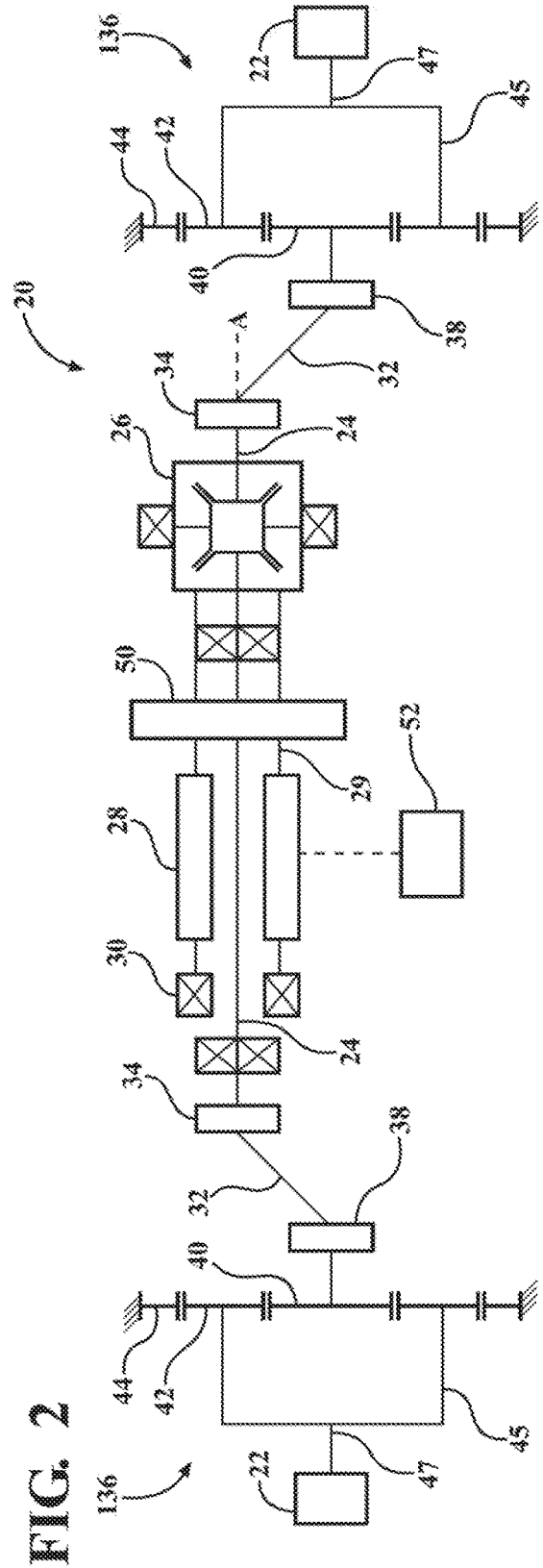
FIG. 2 is a schematic illustration of the example embodiment of a driveline assembly including a second example embodiment of an end reducer including a planetary gear set.

According to a second example embodiment presented in FIG. 2, the pair of end reducers 136 are each a planetary gear system that includes a sun gear 40, a plurality of planet gears 42 positioned about the sun gear 40, and a ring gear 44 disposed about the planet gears 42. A planet carrier 45 is connected to each of the planet gears 42 and a wheel output 47 for transmitting torque to the wheel 22. It should be appreciated that the diameter and tooth size of the gears 40, 42 may be varied in order to provide a desired torque multiplying effect. It should also be appreciated that other planetary gear arrangements may be utilized. It should also be appreciated that the end reducer may alternatively include a system of drive belts/chains or traction drives may be used to provide the gear reduction.

As illustrated in FIGS. 1 and 2, a central reducer 50 may also be positioned between the output shaft 29 of the electric motor 28 and the differential 26 to provide a torque multiplication effect prior to power being transmitted to the primary shafts 24. Accordingly, a torque multiplying effect may be provided by both the central reducer 50 and the end reducers 36, 136. For example, for a very high speed electric motor (e.g., with peak speed in excess of 10,000 RPM) a speed reduction ratio of 2:1 may be provided at the electric motor 28 in addition to the ratio provided by the end reducer 36, 136. It should be appreciated that the subject driveline assembly 20 could alternatively include only the end reducers 36, 136. According to this arrangement, the output of the electric motor 28 is directly connected to the differential 26.

It should be appreciated that the arrangement of the subject driveline assembly 20 lends itself to the deep integration of the primary shafts 24, differential 26, output gears 37, 39, 40, 42, 44 and bearings 30. Due to the low torque levels on the differential 26 provided by the end reducers 36, 136 these various components may be much smaller than conventionally found on drivelines and can be integrated as described. This leads to a much smaller arrangement of the electric powertrain.

According to another aspect of the invention, a controller 52 may be provided to superimpose an order-based or time based torque or speed fluctuation on the electric motor's 28 output shaft 29 to counteract vibrations in the driveline assembly 20. For example, with a lightweight housing of the electric motor 28 and differential 26, there may be low frequency resonances that are difficult to eliminate without adding excessive mass to the housing of the electric motor 28. In this case, providing a motor control system that can avoid exciting resonances or actively cancelling vibrations eliminates the vibration problem with no added mass.

Order-based vibrations are often caused by motion transmission errors in gearing, motion transmission errors in flexible joints or in imbalances in components such as tires. These vibrations can cause excessive NVH and can cause accelerated component wear. These effects can be minimized by modulating the electric motor's speed in to eliminate speed and torque fluctuations at the wheel (or at whichever location leads to lower NVH and wear).

Time-based vibrations are often caused by flexibility in massive structures such as the vehicle's chassis that supports the center section of the driveline. The vibrations happen at a fixed time-based frequency related to the mass of the component/structure and the stiffness of the component/structure. These vibrations can cause excessive NVH and can cause accelerated component wear. These effects can be minimized by modulating the electric motor's torque to reduce structural vibrations.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A driveline assembly for an electric vehicle for driving a pair of wheels, the driveline assembly including:
    an electric motor having an output shaft;
    a differential coupled with the output shaft and configured to receive torque from the output shaft;
    a pair of primary shafts each coupled with the differential and configured to receive torque from the differential;
    a pair of secondary shafts each coupled with one of the primary shafts and configured to receive torque from the respective one of the primary shafts;
    a pair of end reducers each coupled with one of the secondary shafts and configured to receive torque from the respective one of the secondary shafts;
    each of the end reducers including a wheel output directly coupled with one of the wheels to provide a gear reduction and torque multiplying effect at the wheel; and
    a controller connected to the electric motor and configured to superimpose a torque fluctuation at the output shaft to counteract vibrations in the driveline assembly.

2. The driveline assembly for a vehicle as set forth in claim 1 wherein the pair of end reducers each include a planetary gear system including at least a sun gear, a plurality of planet gears disposed about the sun gear, a ring gear disposed about the planet gears, a planet carrier connected to the planet gears, and the wheel output connected to the planet carrier for transmitting torque to the wheel.

3. The driveline assembly for a vehicle as set forth in claim 1 wherein the pair of end reducers each include a first gear having a plurality of teeth and connected to the primary shaft and a second gear being parallel with the first gear and having a plurality of teeth meshed with the teeth of the first gear, wherein the number of teeth on the second gear is greater than the number of teeth on the first gear, and wherein the wheel output shaft is connected to the second gear for transmitting torque to the wheel.

4. The driveline assembly for a vehicle as set forth in claim 1 further including a central reducer positioned between the output shaft of the electric motor and the differential for providing a torque multiplication effect prior to power being transferred to the primary shafts.

5. The driveline assembly for a vehicle as set forth in claim 1 wherein the electric motor is disposed about the primary shaft, and wherein at least one motor bearing is positioned between the primary shaft and the electric motor for allowing the primary shaft to rotate relative to the motor.

6. The driveline assembly for a vehicle as set forth in claim 1 further including a pair of first continuous velocity joints each pivotably connecting one of the primary shafts and one of the secondary shafts and configured to transmit torque from the primary shaft to the secondary shaft while being positioned at various angles relative to the primary shafts.

7. The driveline assembly for a vehicle as set forth in claim 6 further including a pair of second continuous velocity joints each pivotably connecting one of the secondary shafts and one of the end reducers and configured to transmit torque from the secondary shafts to the end reducers while allowing the end reducers to be positioned at various angles relative to the secondary shaft.

8. The driveline assembly for a vehicle as set forth in claim 1, wherein the pair of primary shafts extend along a first axis and the pair of secondary shafts extend along a second axis being different than the first axis.

\* \* \* \* \*